(12) United States Patent
York et al.

(10) Patent No.: US 6,426,581 B1
(45) Date of Patent: Jul. 30, 2002

(54) MAGNET RETAINER RING FOR VEHICLE ALTERNATORS

(75) Inventors: Michael T. York, Chelsea, MI (US); Jeffrey A. Digby, Bowling Green, OH (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/575,623

(22) Filed: May 22, 2000

(51) Int. Cl.⁷ ................................................ H02K 1/22
(52) U.S. Cl. ......................................... 310/263; 310/43
(58) Field of Search .......................... 310/91, 261, 263, 310/43, 45, 156; 29/596–598

(56) References Cited

U.S. PATENT DOCUMENTS

| | | | |
|---|---|---|---|
| 5,483,116 A | 1/1996 | Kusase et al. | 310/263 |
| 5,543,676 A | 8/1996 | York et al. | 310/263 |
| 5,793,143 A | 8/1998 | Harris et al. | 310/263 |
| 5,793,144 A | 8/1998 | Kusase et al. | 310/263 |
| 5,903,084 A | 5/1999 | Asao et al. | 310/263 |
| 5,907,209 A * | 5/1999 | Ishida | 310/263 |
| 5,973,435 A | 10/1999 | Irie et al. | 310/263 |
| 6,002,194 A | 12/1999 | Asao | 310/269 |
| 6,013,967 A | 1/2000 | Ragaly et al. | 310/263 |
| 6,013,968 A | 1/2000 | Lechner et al. | 310/263 |
| 6,144,138 A * | 11/2000 | Ragaly | 310/263 |
| 6,157,111 A * | 12/2000 | Asao | 310/263 |
| 6,201,335 B1 * | 3/2001 | Higashino et al. | 310/263 |

* cited by examiner

Primary Examiner—Tran Nguyen
(74) Attorney, Agent, or Firm—Quarles & Brady LLP

(57) ABSTRACT

A generally annular magnet retainer is provided for use in a rotor of a rotating electrical machine. The retainer includes a generally annular ring that is configured to be assembled between first and second claw poles, and further includes a plurality of pockets extending therefrom defining a plurality of cavities that are configured to receive a corresponding plurality of magnets therein.

17 Claims, 4 Drawing Sheets

MAGNET RETAINER RING FOR VEHICLE ALTERNATORS

BACKGROUND OF THE INVENTION

1. Field of the Invention

The present invention relates generally to vehicle alternators, and in particular, relates to a magnet retainer ring that is configured to house a plurality of permanent magnets within a rotor.

2. Description of the Related Art

A conventional alternator for a vehicle includes a rotor having a rotor coil that is wound coaxially about a generally cylindrical rotatable shaft. First and second opposed claw poles are mounted onto the shaft on either side of the coil so as to encase the coil, and include a first and second plurality of axially extending fingers, respectively, that intermesh to enclose the outer circumference of the rotor. It is well known that the rotor coil generates magnetic flux when an electric current is passed through it, thereby polarizing the claw pole fingers. In order to reduce the magnetic flux leakage between the claw poles, and thereby increasing overall field magnetic flux and output power, it is known to include a plurality of permanent magnets in the rotor. Such an assembly should be designed to permit the magnet-retainer ring to operate reliably, as the rotor typically rotates up to 21,000 rpm during operation of the vehicle and therefore endures severe vibration, acceleration, and may additionally present a corrosive environment. Additionally, the magnet retention mechanism should be refined so as to facilitate ease of assembly and efficiency of manufacture.

Previously manufactured rotors include a plurality of permanent magnets that are mounted at one side of the claw pole finger onto holding strips by an adhesive. Because the typically brittle magnets are not encapsulated, this arrangement is susceptible to vibrations which could create magnet fragments, thereby causing the rotor to fail. Additionally, prior rotor assemblies may require separate heat resistant elements because air is unable to flow through the assembly. The implementation of heat resistant elements results in increased cost of manufacture.

It is therefore desirable to provide a magnet retaining member that protects the magnets from damage during operation of the rotor, that is robust, and that is efficient and relatively inexpensive to manufacture.

BRIEF SUMMARY OF THE INVENTION

A rotor of a rotating electric machine is provided having a simplified magnet retainer ring that is robust and that protects the magnets from becoming damaged or fragmented during operation of the rotor. Furthermore, the magnet retainer ring is constructed so as to be efficiently mass-produced.

In accordance with a first aspect of the invention, a rotor assembly of a rotating electric machine includes a plurality of magnets disposed therein to reduce the magnetic flux leakage between claw pole fingers and to additionally provide additional magnetic flux through the magnetic circuit, thereby increasing overall field magnetic flux and output power. A magnet retainer ring is provided having a generally annular inner ring that 1) is configured to sit within the adjacent claw pole members and 2) has a sufficiently large inner diameter so as to accommodate a rotor coil therein. The magnet retainer ring includes trapezoidal pockets that extend outwardly therefrom, and that are hingedly connected to the ring. The pockets define cavities that are configured to receive a plurality of permanent magnets therein. In accordance with an alternate embodiment, the magnets are overmolded during manufacturing of the magnet retainer ring, thereby permanently housing the magnets. When the rotor assembly installed, the magnets are generally aligned with, and are disposed radially inward with respect to, a corresponding pole finger.

In accordance with another aspect of the invention, the magnet retainer ring includes a flexible base having notches extending therefrom to permit the magnets to be easily press-fit into the cavities. Because the only side of the magnet that may not be permanently encapsulated by the rotor assembly experiences a compressive force, there is a relatively low risk that the magnets will produce fragments that could cause the rotor to fail.

In accordance with another aspect of the invention, the magnet retainer ring is a unitary piece of molded plastic. Additionally, a user may simply insert the magnets into the cavities with, for example, his or her fingers. Accordingly, the magnet retainer ring may be efficiently mass-produced and easily assembled within a rotor.

These as well as other features and characteristics of the present invention will be apparent from the description which follows. In the detailed description below, preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

BRIEF DESCRIPTION OF THE DRAWINGS

Reference is hereby made to the following figures in which like reference numerals correspond to like elements, and in which:

FIG. 6 is a sectional side elevation view of FIG. 3, taken along line 6—6;

FIG. 7 is a sectional side elevation view of FIG. 6, taken along line 7—7;

FIG. 8 is a sectional side elevation of FIG. 2, taken along line 8—8;

DETAILED DESCRIPTION OF THE PREFERRED EMBODIMENT

Pursuant to a preferred embodiment of the invention, a rotor assembly for a rotating electric machine suitable for use in an alternator of an automobile comprises a first magnetic claw pole, a rotor coil, a magnet retainer ring housing a plurality of permanent magnets, and a second magnetic claw pole. While fans are not a necessary part of the illustrated rotor assembly, one skilled in the art will recognize that fans could be installed, if so desired. The first and second magnetic poles include corresponding first and second pole fingers which intermesh when mounted onto a rotatable shaft. The magnet retainer ring includes a plurality of pockets extending outwardly therefrom that are configured to receive a corresponding permanent magnet therein. The pockets are staggered about the retainer ring so that when the rotor is assembled, each pocket will be generally aligned with, and disposed radially inward with respect to, a corresponding pole finger of the first or second magnetic poles. In accordance with an alternate embodiment of the invention, the permanent magnets have rounded edges and are overmolded by the magnet-retainer ring during manufacturing to permanently retain the magnets within the pockets during operation of the rotor.

Figure 1:
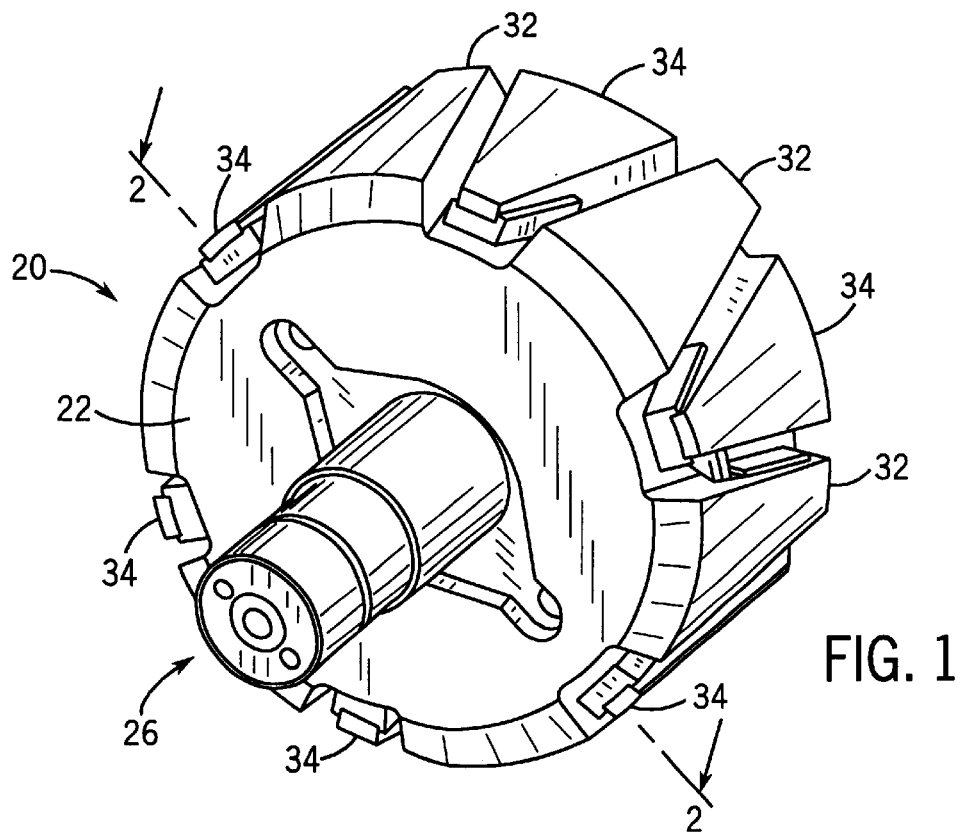
FIG. 1 is a perspective view of a rotor assembly constructed in accordance with a preferred embodiment of the present invention.
Figure 2:
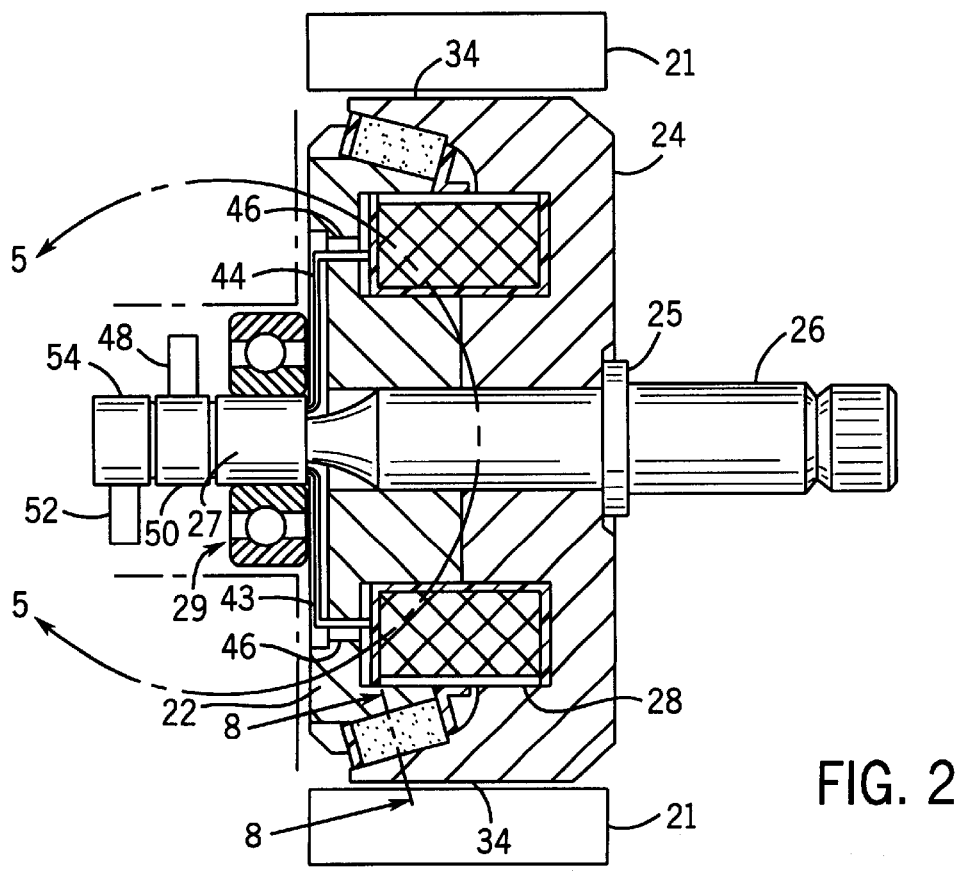
FIG. 2 is a sectional side elevation view of the rotor assembly of FIG. 1 taken along line 2—2.
Figure 3:
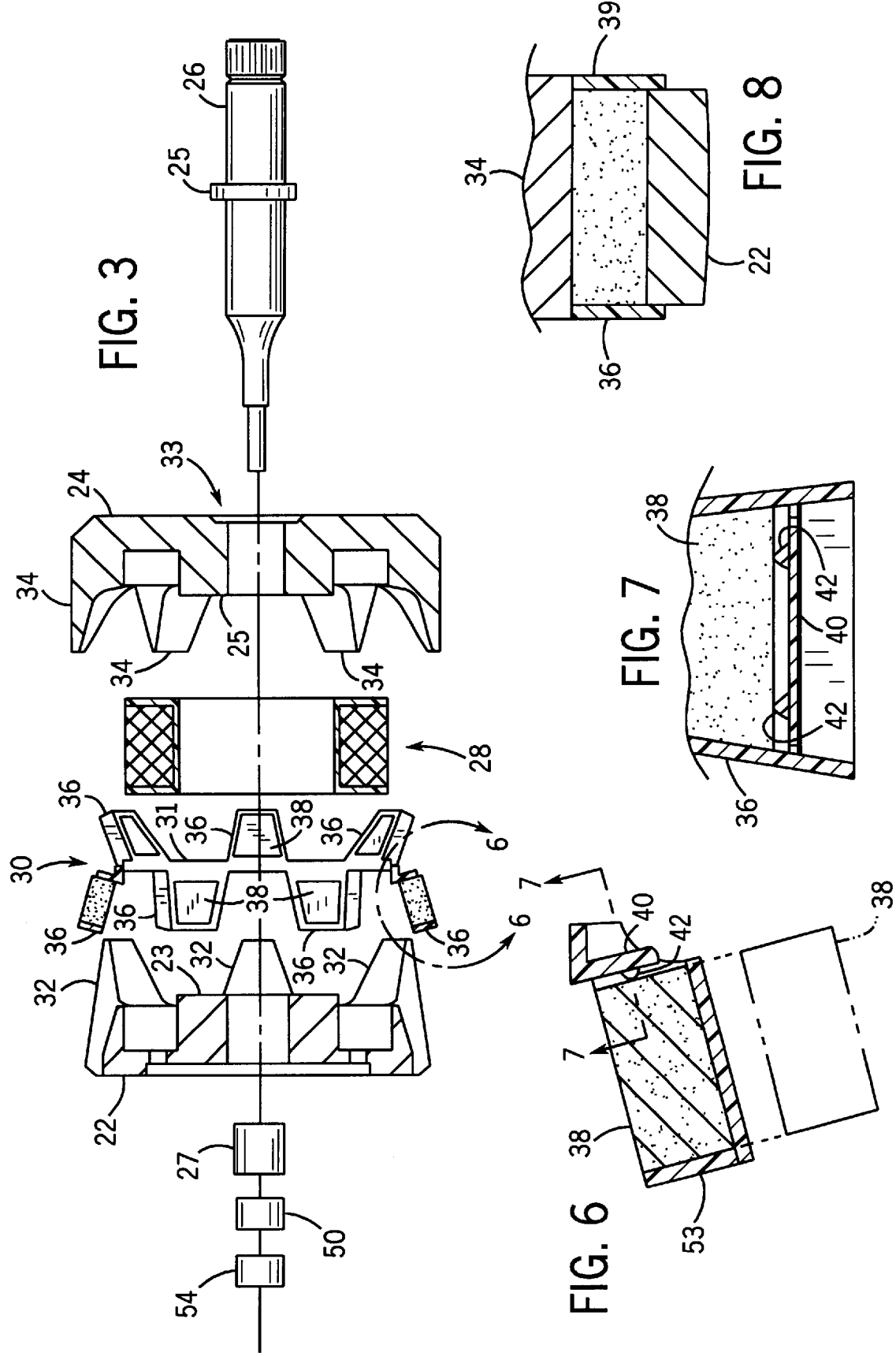
FIG. 3 is an exploded assembly view of the rotor of FIG. 1 a portion of the rotor assembly being cutaway.

Referring initially to FIGS. 1–3, a rotor assembly 20 comprises a rotor coil 28 that is wound coaxially about a rotatable shaft 26. First and second claw poles 22 and 24, respectively, are mounted coaxially onto a rotatable shaft 26 so as to encase the rotor coil 28. Specifically, the first and second claw poles 22 and 24 include a plurality of corresponding first and second pole fingers 32 and 34, respectively, which protrude generally axially from the corresponding claw pole and towards the opposite claw pole. The pole fingers 32 and 34 are staggered about the corresponding claw poles 22 and 24 such that when the rotor assembly is mounted onto the shaft 26, the pole fingers are intermeshed so as to encase the coil 28. The claw poles preferably comprise a low carbon steel (iron). Those skilled in the art will recognize rotor assembly 20 as being generally of the Lundell or "claw-pole" type, used widely in motor vehicle alternators. The rotor assembly 20 may be used in combination with a stator 21 as is well known in the art, and further includes a generally cylindrical magnet retainer ring 30, that is coaxially mounted about the shaft 26. The magnet retainer ring 30 includes an inner annular ring 31 having an inner diameter greater than the outer diameter of the rotor coil 28 so as to surround the coil when installed in the rotor assembly, as will be described below. Advantageously, the rotor assembly 20 is configured to permit air to flow through the pole fingers 32 and 34 during operation of the rotor, thereby preventing the assembly from overheating. Accordingly, the rotor assembly 20 need not include heat resistant elements to prevent the components from overheating.

The first and second claw poles 22 and 24 include hubs 23, and 25, which are configured to be mounted onto the rotatable shaft 26 via knurles (not shown) on the shaft 26. Specifically, the knurles create grooves in the inner diameter of hubs 23 and to create interference fit between the shaft and claw poles 22 and 24 as the shaft is inserted into the hubs. The interference between the shaft 26 and hubs 23 and 25 permits the rotor assembly to rotate with the shaft. The shaft 20 further includes an annular shoulder 25 that is received by a counter bore 33 in claw pole 24 to provide a stop for the shaft during installation. The shaft 26 is inserted into a generally cylindrical bearing support member 27, as shown in FIG. 3. A roller bearing 29 is mounted onto the support member 27 and facilitates rotation of the rotor assembly 20. The magnet retainer ring includes a generally annular inner ring 31 that has an inner diameter slightly greater than the outer diameter of the rotor coil 28. The coil 28 is at least partially disposed within a cylindrical cavity 45 that is defined by the ring 31.

Figure 5:
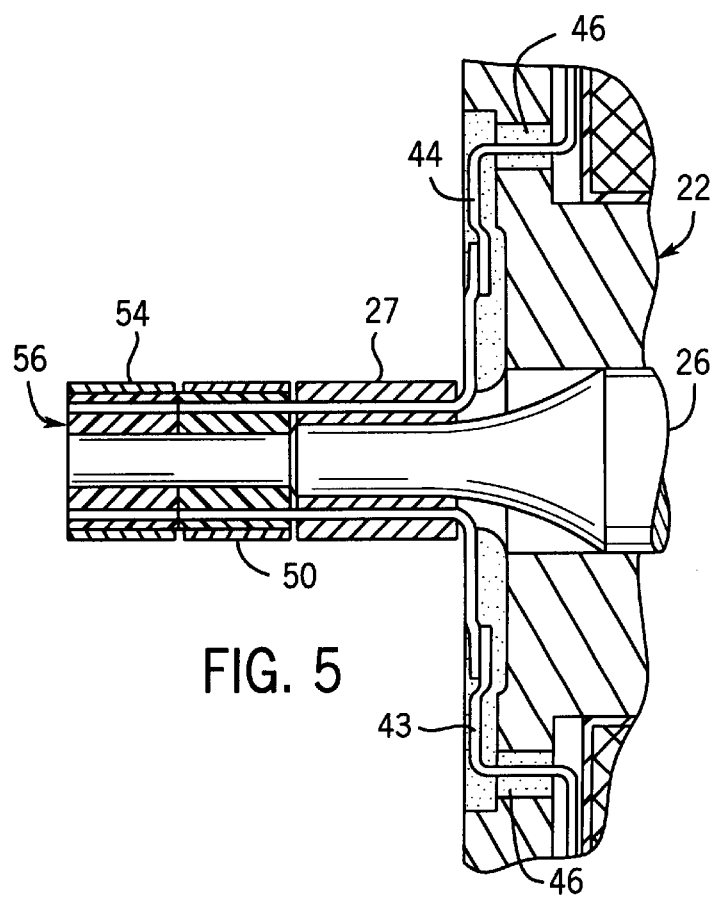
FIG. 5 is a sectional side elevation view of FIG. 2, taken along line 5—5.

Referring now to FIGS. 2 and 5, first and second slip rings 50 and 54 are connected to first and second brushes 48 and 52, respectively. First and second coil wires 43 and 44 are connected to the rotor coil 28 at one end and extend through apertures 46 in the first claw pole 22 and through the inner diameter of the bearing 29, and are welded to their respective first and second slip rings 50 and 54 to complete an electrical circuit. Insulation 56 surrounds the coil wires 43 and 44 within the slip rings as is well known in the art.

Figure 4:
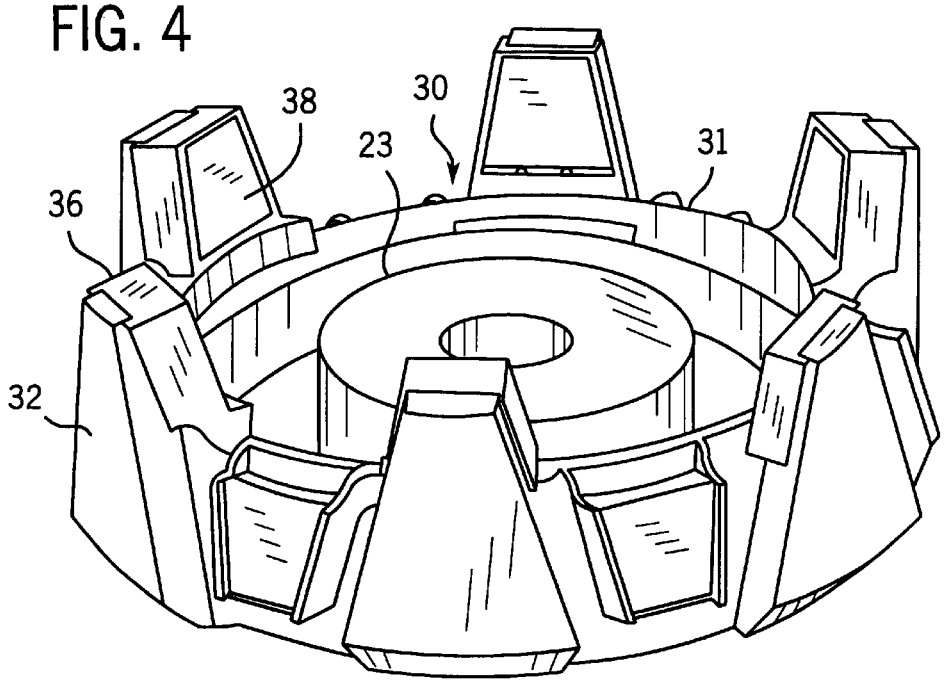
FIG. 4 is a perspective view of a portion of the rotor assembly of FIG. 1.
Figure 11:
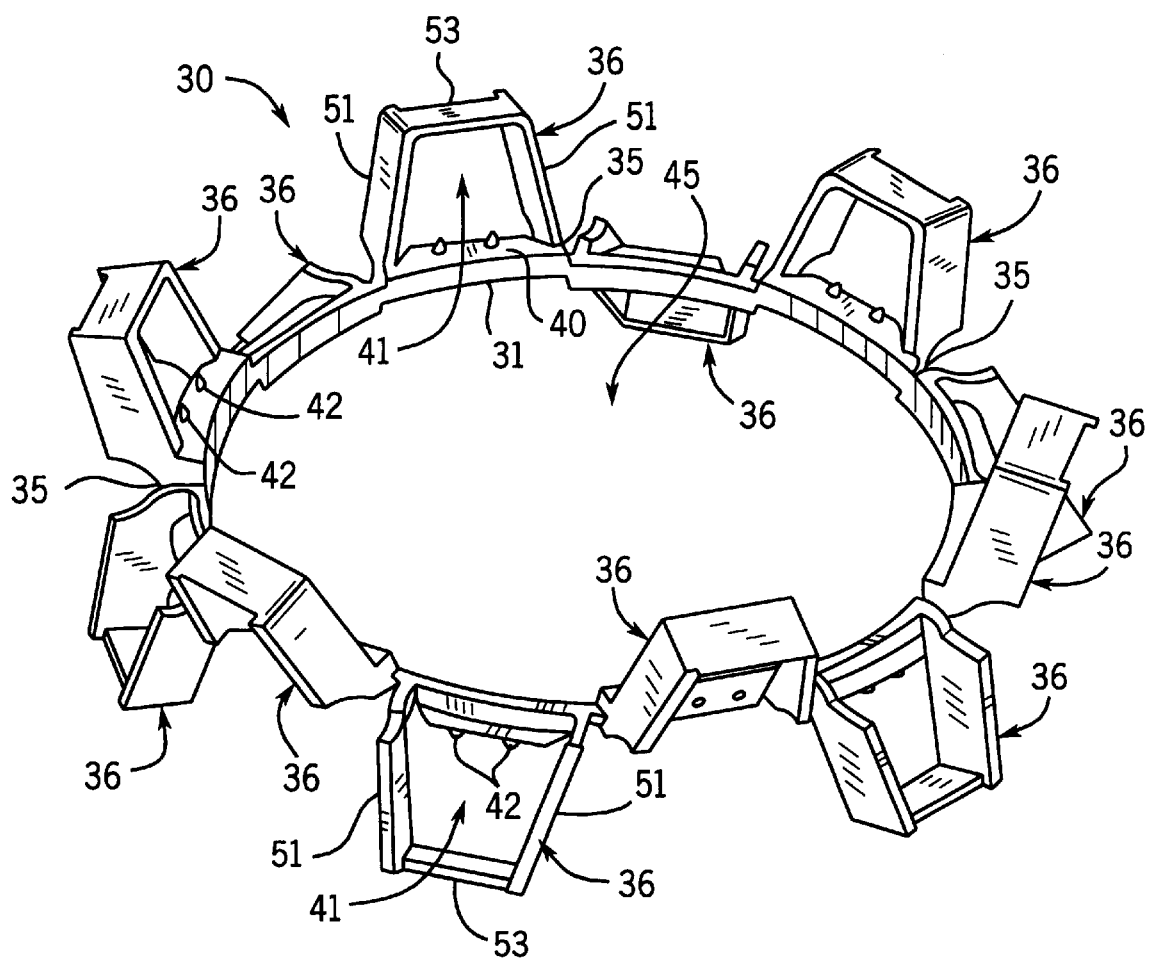
FIG. 11 is a perspective view of a magnet retainer ring constructed in accordance with a preferred embodiment of the invention.

Referring also to FIGS. 6, 7 and 11, the magnet retainer ring 30 is a one piece molded plastic body whose generally annular inner ring 31 may be hingedly connected to a plurality of staggered trapezoidal pockets 36 extending angularly outwardly therefrom. The retainer ring 30 includes plastic hinge sections 35 that permit the pockets 36 to swivel radially to permit the pockets to mate with the pole fingers 32 and 34, as will be described below in more detail. Each pocket 36 comprises an upper wall 53; a flexible bottom support member 40 that is parallel to, and has a greater length, than the upper wall 53; and two side walls 51 that are connected from the ends of the upper wall 53 to the ends of the bottom support member 40. The pockets 36 therefore define a plurality of trapezoidal cavities 41 that are configured to receive a corresponding trapezoidal permanent magnet 38 therein. It should be appreciated that the pockets 36 and cavities 41 could assume alternate configurations in order to accommodate magnets of varying sizes and shapes. In accordance with the preferred embodiment, each pocket 36 further includes a pair of notches 42 extending upwardly from the flexible bottom support member 40. As a result, the magnets 38 are inserted into the pockets 36 by pressing them into the pockets using one of any known conventional methods. The flexible member 40 retains the magnets in position by "pinching the magnet" and thereby retaining the magnet within the pocket. The flexible member 40 additionally takes up tolerances on both the magnet 38 and the pockets 36 to one facilitate efficient manufacture, and to accommodate a variety of magnet-pocket fits Referring also to FIG. 4, the first and second pole fingers 32 and 34 form a smooth surface alongside the pole fingers 32 and 34 (only pole fingers 32 are shown). The pockets 36 and corresponding magnets 38 are disposed generally aligned with, and radially inward with respect to, the pole fingers 32 and 34, which act as mechanical stops for the magnets during operation of the rotor assembly 20. Accordingly, the rotor assembly 20 provides sufficient coverage of the magnets 38 so as to protect them during operation of the rotor. Surface 39 of the magnet 38 is partially covered by the first claw pole 22, as shown in FIG. 8. Surface 39, however, experiences compressive centrifugal forces during operation of the rotor, thereby minimizing the risk that magnet fragments would be released into the rotor. The outer diameter of the inner ring 31 is slightly less than the distance between opposite fingers of a claw pole. The ring 30 is therefore disposed radially inward with respect to the claw poles 22 and 24.

Figure 9:
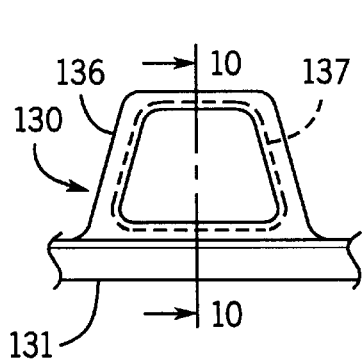
FIG. 9 is a side elevation view of a portion of a retainer ring constructed in accordance with an alternate embodiment of the present invention.
Figure 10:
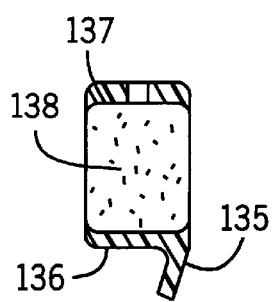
FIG. 10 is a sectional side elevation view of FIG. 9 taken along line 10—10.

Referring now to FIGS. 9 and 10, an alternate embodiment is illustrated having reference numerals corresponding to like elements of the first embodiment incremented by 100. In accordance with an alternate embodiment, the magnets 138 are placed in the molding die during manufacturing and are held in place by locator pins (not shown). The magnets 138 are then over-molded by the plastic that ultimately forms the retainer ring 130. The magnets 138 may have rounded corners and edges 137, in which case the interference between the magnets and the plastic forming the pockets 136 will permanently retain the magnets within the retainer ring 130. Otherwise, if no rounded corners or edges are present, the adhesion between the molded plastic and the magnets 138 will assist in the magnet retention. During the molding process, a locator area (not shown) is formed within the pockets 136 to accommodate above-mentioned locator pins. Of course, it should be appreciated that the locator area may be thicker or thinner depending on the thickness of the magnet. Additionally, those skilled in the art should recognize that a locator may not be necessary depending on the size and shape of the magnet.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

We claim:

1. A magnet retainer ring for use in a vehicle alternator having a rotatable shaft supporting an electric coil wound coaxially about said shaft, said coil being encased in opposed claw pole pieces having radially extending magnetically permeable faces adjacent to axially opposed faces of said coil and having interdigitating fingers enclosing the outer circumference of said coil, said magnet retainer ring comprising:

a substantially annular body for fitting coaxially about said shaft and around said coil; and a plurality of pockets extending axially on either side of said annular body so as to be positioned beneath said interdigitating fingers, the pockets having walls defining a corresponding plurality of cavities opening radially therethrough and sized to receive a corresponding plurality of permanent magnets therein such that at least a portion of each of the magnets are at least partially disposed in the corresponding opening.

2. The magnet retainer ring of claim 1, further, wherein each of said pockets further comprises a flexible base.

3. The magnet retainer ring of claim 2, wherein said flexible base includes a plurality of notches extending upwardly therefrom so as to engage said corresponding magnet.

4. The magnet retainer ring of claim 1, wherein said annular body and said plurality of pockets are a unitary molded plastic body.

5. The magnet retainer ring of claim 1, wherein said retainer ring further includes plastic hinges connecting said pockets to said annular ring, wherein said pockets are flexible radially with respect to said annular body.

6. The magnet retainer ring of claim 4, wherein said plurality of magnets are overmolded by said plastic body so as to encapsulate said magnets within said pockets.

7. The magnet retainer ring of claim 6, wherein said plurality of magnets have rounded edges.

8. A rotor for a rotating electric machine, said rotor comprising:

a generally cylindrical rotatable shaft;

a rotor coil would coaxially about said shaft;

a magnet retaining member disposed coaxially about said rotatable shaft and surrounding said rotor coil, said magnet retaining member having a plurality of pockets extending from a generally annular body, wherein each of said pockets include walls defining a cavity therein that is configured to receive a corresponding one of a plurality of magnets therein;

a first substantially annular magnetic pole mounted coaxially on said shaft;

a second substantially annular magnetic pole mounted coaxially on said shaft, and adjacent said first magnetic pole;

a plurality pole fingers extending from one of said first and second magnetic poles and facing the other of said first and second poles, wherein said pole fingers extending from said first magnetic pole intermesh with said pole fingers extending from said second magnetic pole, and the pockets are positioned such that such that a substantial portion of the magnet housed within the cavity is disposed radially inwardly with respect to the corresponding finger.

9. The rotor of claim 8, wherein each of said pockets is disposed radially inward with respect to a corresponding one of said pole fingers, and are generally aligned with said one of said pole fingers.

10. The rotor of claim 8, wherein said pockets extend axially and radially outwardly from said generally annular body.

11. The rotor of claim 8, wherein said retaining member is formed from a molded plastic.

12. The rotor of claim 11, wherein said plurality of magnets are overmolded by said plastic body so as to encapsulate said magnets within said pockets.

13. The rotor of claim 8, wherein each of said pockets includes a flexible bottom support member.

14. The rotor of claim 13, wherein said bottom support member includes notches extending therefrom so as to engage the magnet disposed in said pocket.

15. The rotor of claim 8, wherein said magnets are disposed in, and overmolded by, plastic defining said pockets.

16. The rotor of claim 8, wherein said annular ring defines a cylindrical cavity, and wherein said rotor coil is at least partially disposed within said cylindrical cavity.

17. A plastic magnet retainer ring for use in a vehicle alternator having a rotatable shaft supporting an electric coil wound coaxially about said shaft, said coil being encased in opposed claw pole pieces having radially extending magnetically permeable faces adjacent to axially opposed faces of said coil and having interdigitating fingers enclosing the outer circumference of said coil, said magnet retainer ring comprising:

a substantially annular body for fitting coaxially about said shaft and around said coil; and a plurality of pockets extending axially on either side of said annular body, the pockets having walls defining a corresponding plurality of cavities opening radially inward and sized to receive a corresponding plurality of permanent magnets therein, wherein said magnets are overmolded by said plastic, and wherein said cavities are disposed radially inwardly with respect to said interdigitating fingers.

* * * * *

UNITED STATES PATENT AND TRADEMARK OFFICE
CERTIFICATE OF CORRECTION

PATENT NO. : 6,426,581 B1
DATED : July 30, 2002
INVENTOR(S) : Michael T. York and Jeffrey A. Digby It is certified that error appears in the above-identified patent and that said Letters Patent is hereby corrected as shown below:

Title page,
Item [57], ABSTRACT,
Line 4, "plurailty" should be -- plurality --.

Column 3,
Line 55, "hubs 23 and to" should be -- hubs 23 and 25 to --;

Column 4,
Line 40, insert a period (.) after "fits";
Line 67, "comers" should be -- corners --;

Column 6,
Line 17, "such that such that" delete "2nd instance of "such that";

Signed and Sealed this

Twenty-fifth Day of February, 2003

JAMES E. ROGAN
*Director of the United States Patent and Trademark Office*